(12) United States Patent
Burwick

(10) Patent No.: US 11,022,865 B2
(45) Date of Patent: Jun. 1, 2021

(54) LED EFFECTS PROJECTOR

(71) Applicant: Rosco Laboratories Inc., Stamford, CT (US)

(72) Inventor: Jack Burwick, York, PA (US)

(73) Assignee: Rosco Laboratories Inc., Stamford, CT (US)

( * ) Notice: Subject to any disclaimer, the term of this patent is extended or adjusted under 35 U.S.C. 154(b) by 0 days.

(21) Appl. No.: 16/250,607

(22) Filed: Jan. 17, 2019

(65) Prior Publication Data

US 2019/0219904 A1 Jul. 18, 2019

Related U.S. Application Data

(60) Provisional application No. 62/618,330, filed on Jan. 17, 2018.

(51) Int. Cl.
*G03B 21/14* (2006.01)
*G03B 21/20* (2006.01)
*G03B 21/16* (2006.01)

(52) U.S. Cl.
CPC .......... *G03B 21/142* (2013.01); *G03B 21/16* (2013.01); *G03B 21/2033* (2013.01)

(58) Field of Classification Search
CPC ... G03B 21/142; G03B 21/16; G03B 21/2033

USPC .......................................................... 353/52
See application file for complete search history.

(56) References Cited

U.S. PATENT DOCUMENTS

| 4,217,040 | A | * | 8/1980 | Longerbeam | A63J 17/00 353/46 |
| 5,769,527 | A | * | 6/1998 | Taylor | G05B 19/0421 315/316 |
| 5,902,032 | A | * | 5/1999 | Hannigan | F21S 10/00 353/38 |
| 2014/0177218 | A1 | * | 6/2014 | Verbrugh | F21V 7/04 362/231 |
| 2014/0231788 | A1 | * | 8/2014 | Krall | H01L 27/3211 257/40 |
| 2015/0003099 | A1 | * | 1/2015 | Rasmussen | F21V 21/15 362/523 |
| 2016/0369961 | A1 | * | 12/2016 | Barham | F21S 10/007 |
| 2017/0074476 | A1 | * | 3/2017 | Jurik | F21V 14/06 |
| 2017/0074497 | A1 | * | 3/2017 | Jurik | F21V 7/0091 |

* cited by examiner

*Primary Examiner* — Jerry L Brooks
(74) *Attorney, Agent, or Firm* — Whitmyer IP Group LLC

(57) ABSTRACT

This system relates to a projection fixture designed to create a rippling effect in a variety of colors. By using an RGBX color mixing technique, a variety of colors can be produced without the need for color filters which detract from the overall brightness of the beam. A passive cooling technique is also used which allows for silent operation of the projection fixture. Ripple effects may be created through the use of glass gobos that have the capabilities to rotate.

17 Claims, 3 Drawing Sheets

LED EFFECTS PROJECTOR

TECHNICAL FIELD

The technical field of this invention is LED projection fixtures. By using a plurality of different color LEDs, or white LEDs alone an efficient effects projection fixture can be made.

BACKGROUND

In the field of lighting, a projector that can create a ripple effect is useful for plays, recitals, films, and other events. Ripple effects can be created by inserting glass gobos into the gobo holder of a projector. The glass gobo is designed to have different thickness and opacity at various points throughout the gobos glass face. Thus, when light is projected through the gobo and onto a surface to be lit, the lighting makes the surface appear to have ripples.

In some projectors more than one gobo can be used at a time. This projects the light through two gobos at once, which can create a more substantial ripple effect, or put designs within the ripple effect. The gobos can then be rotated to create a moving ripple effect. This is often done through the use of potentiometers which could control both the speed and the direction of the rotation of the gobos. A projector of this type may also be run via a Digital multiplex system, thus allowing for integration with other effects in a production or attraction.

To produce light in ripple projectors, it is common in the art to use an Enhanced Metal Arc source. Enhanced Metal Arc sources are great for providing strong, at least 200 W, and long-lasting lamp life, about 7000 hours. The short arc allows for an output of around 5000 lumens. However, Enhanced Metal Arc systems are rather expensive and run very hot. Enhanced Metal Arc systems are often limited to a single color temperature. Colored filters or lenses are thus required to change the color of the emitted light.

In order to cool the lamp during use, preventing damage to the system, fans are installed inside the projector. Fans are quite noisy to run, which is detrimental to use in a theatre setting because background noise can take away from the overall performance. Further, with so many delicate parts, ripple producing projectors have not been designed for outdoor use. Rain and other potential solid or liquid projectiles cause significant damage to the components of these machines.

SUMMARY

The present disclosure is a ripple producing projector that has been designed to contain a cost effective, long-life light source, and produce varieties of colors without the use of extra filters and lenses. The design is also optimized for outdoor use and is passively cooled. Passive cooling eliminates idle noise produced by fan cooling systems.

Instead of previously used Metal Arc systems, this system contains semi-conductor lighting devices, preferably LEDs. The LEDs can be either white, UV, or RGBX color mixing. With Color mixing LEDs the color of the light can be controlled through signal to the LEDs and thus does not require any movement of lenses or filters within the machine. This provides a system with a faster response and less moving parts. The dimming capabilities of LED lights are also significantly better than Metal Arc systems. The dimming can be much smoother, and reach levels below one percent of the brightest light. This is advantageous to any use of the ripple producing projector.

Along with the LEDs the ripple producing projector will have a variety of external lenses designed to achieve a variety of narrow to wide beams depending on the user's current preference. By positioning of the gobos slightly off center and/or overlapping the system will produce a beam that does not appear to have a visible direction or pattern. This allows for a more life-like, less artificial, lighting effect. The use of overlapping gobos has the added benefit of creating a 3D effect due to the interplay with the focusing optics. Additionally, beam shutters may be added to aid beam shaping and control.

The system optimally has a passive cooling system which provides for a quieter system during operation. Passive cooling techniques could be as basic as heatsinks, or utilize small pumps or economizers, all of which remove internal heat to the surrounding environment.

Another important aspect of the invention is protecting the internal components from outside projectiles. For example, water inside a lighting system could be disastrous. Therefore, the present device will be equipped with an outer encasement. This encasement will protect the inner parts so that it is at least capable of sustaining a working condition while being hit with low pressure water jets. The shell will also provide basic protection from projectiles. This will allow the device to be used in an outdoor setting, where the elements are not as predictable as they would be inside, say, an auditorium.

It is also important the ripple producing projector has DMX and RDM controls. This allows the projectors to function with other intelligent devices, and fit into many universal lighting systems. The DMX controls should be connected with at least five channels. Optimally, in a UV or white light LED system there will be five channels and in the RBGX LED system there will be eight channels. These can control, for example, the gobos, brightness, and color mixing.

As a result of this efficient system, the ripple producing projector will be both lighter and smaller than previous systems providing the same effect. Further, the new ripple producing projector will have more cost effective upkeep and require less energy to function properly.

DETAILED DESCRIPTION

Figure 1:
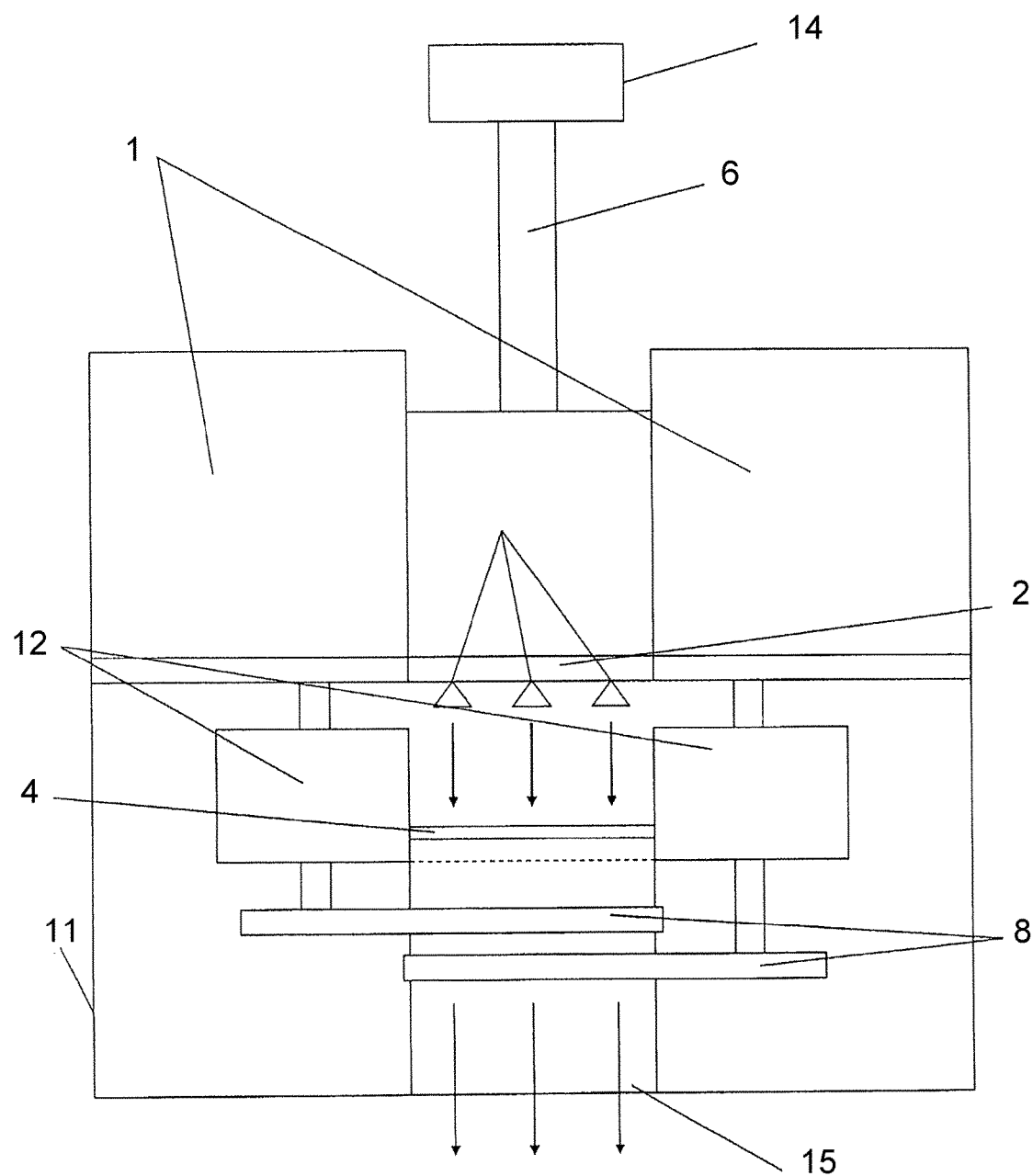
FIG. 1 is an internal view of one embodiment of the projector.

FIG. 1 displays one embodiment of the present system. LED bulbs 3 are connected to the LED power source via the controller 2. The LED controller 2 is optionally connected to DMX or RDM controls via connector 6. Connector 6 leads outside of the encasement 11 to connect with the outside DMX control station 14, or other controller, which will send control signals to the controller 2. These signals can control at least the brightness of the LED bulbs 3. In one embodiment, the DMX control station 14 may be optionally connected to the LED power source and controller 2 via a wireless connection.

To produce light of a variety of colors an RGBW color mixing technique may be used. This technique requires are least four LED bulbs 3. In one embodiment there is a Red, Green, Blue, and White LED, however other combinations such as Red, Green, Blue and Amber may also be used. By controlling the brightness of each bulb, a variety of colors can be produced. For example, if the blue, red, and white lights are all turned off while the green light is on, a green beam will be produced. If only the red and white lights are turned off, a cyan light beam will be produced. By controlling the brightness of the green and blue beams, a plethora of colors around cyan can be produced. A problem in the field of LED color mixing bulbs was that the red, green, and blue bulbs were not good at creating white or pastel like colors. This is solved by the addition of a white LED to the color mixing system.

After the light is emitted from the LEDs it may next pass through a collection optic 4 which transforms the raw LED light into a collimated beam. The collimated beam then passes through the glass gobos 8. The glass gobos 8 are preferably designed to create a rippling effect, but may be designed to create any other effect. The gobos are connected to at least one gobo controller 12. In a preferable embodiment of the system, the gobos are inserted into the encasement 11 using a gobo holder. The gobo controller 12 can rotate the gobos 8 at least rotationally around a line perpendicular to the glass face of the gobos. The gobo controller 12 is also able to control the speed of rotation of the gobos 8. In some embodiments, the gobos 8 may be internally stored in the encasement 11. In a preferred embodiment, the gobo controller 12 is connected with the DMX control station 14 via DMX connector 6. In this way, the speed and direction of the gobo's rotation can be controlled remotely as well as simultaneously with the rest of the system. The gobo controller 12 can either control the gobos individually or control them together. Controlling the gobos 8 separately would allow them to rotate in opposite directions of each other and at varying speeds.

The movement of the gobos can be designed to create a ripple effect. If the gobos have imperfections in the glass which create a unique looking beam of light, and are then motioned, the collimated beam will appear rippled. The gobos may be rotated or moved in a direction perpendicular to the collimated beam. This may depend on the desired effect, or design of the light fixture. In some embodiments the gobos 8 will be offset, as shown in FIG. 1, but in other embodiments the gobos 8 may be aligned. One skilled in the art would understand that the motion perpendicular to the collimated beam may still be rotatory, such as around an axis displaced from the center of the collimated beam.

Another aspect of the invention is the passive cooling system 1. Depicted in FIG. 1 as a heat sink, the passive cooling system may also be a pump, economizer, or other passive cooling device. By using a heat sink, or other passive cooling device, with the LED power source and controller 2, the heat produced will return to the environment and help prevent the risk of damage to components inside encasement 11, and thus optimizing their useful life. Passive cooling systems are especially advantageous due to their silence during operation. Instead of having fans running, the passive cooling system 1 removes heat quietly. Furthermore, cooling fans consume additional energy and generate additional heat, making for a system that is less energy efficient.

Figure 2:
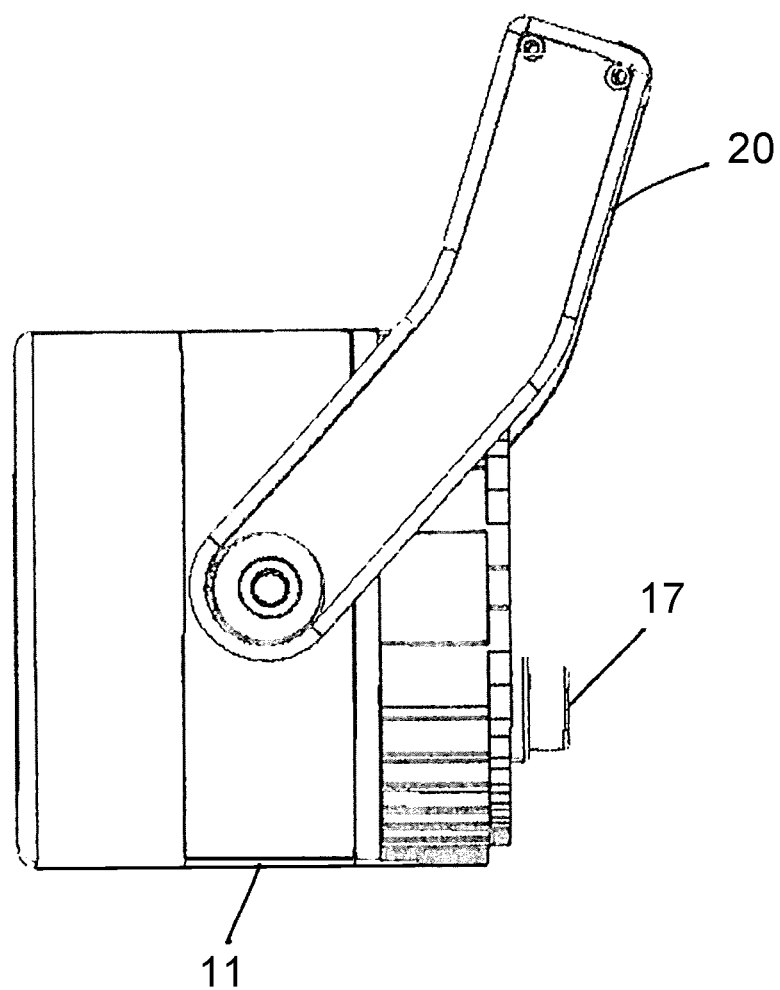
FIG. 2 is an external view of one embodiment of the projector.

FIG. 2 shows an embodiment of an external view of the projector system. The encasement 11 is made up of multiple components that are joined together in such a way as to form a seal that is impervious to outside elements. A lens 17, shown in FIG. 3 may be placed inside the threaded opening 15. This lens may comprise one or more lenses to adjust the beam. Further, an arm 20 may be attached to the encasement 11 to more easily place the light fixture in a desired location.

Figure 3:
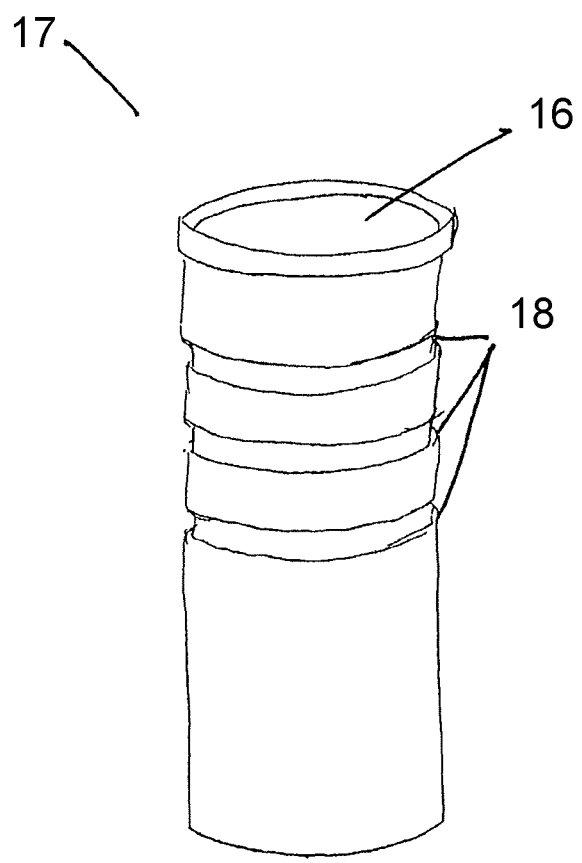
FIG. 3 is a lens.

FIG. 3 shows an example of an external lens that is screwed into the threaded opening 15 on the front of the projector via threads 18. The lens 16 can be modified to spread the collimated beam to the desired beam spread according to the specific optic as well as user desire. Additionally, the user could have a system of lenses that are easily inserted or removed from the threaded opening 15, in order to achieve a desired light beam or light effect.

What is claimed is:

1. A light fixture which creates a ripple effect comprising:
   a housing containing:
      a plurality of semi-conductor light sources;
      a passive cooling system;
      a gobo controller which drives a first gobo, and
      a collection optic configured to collimate a plurality of light beams emitted from the semi-conductor light sources before the plurality of light beams pass through the first gobo;
   a removable lens partially inserted into a threaded opening in the housing,
   wherein when the removable lens is inserted, the housing is waterproof.

2. The light fixture of claim 1, further comprising a second gobo;
   wherein the gobo controller rotates the first and second gobos around an axis perpendicular to a face of the gobos.

3. The light fixture of claim 2, wherein a face of the first gobo is glass; and wherein the face of the second gobo is glass.

4. The light fixture of claim 1, wherein the passive cooling system is a heat sink, pump, or economizer.

5. The light fixture of claim 1, wherein the passive cooling system is a heat sink comprising a plurality of fins.

6. The light fixture of claim 5, wherein the heat sink is enclosed within an encasement of the light fixture.

7. A system of gobos comprising:
   a semi-conductor light source configured to emit light;
   a collection optic to collimate the light;
   a lens controlling the width of a light beam; and
   a first gobo having a glass face and a second gobo having a glass face;
   wherein the light beam passes through the collection optic before passing through the gobos;
   wherein the light beam passes through the gobos before passing through the lens;
   a gobo controller which rotates the first gobo and the second gobo around an axis perpendicular to the glass face of the gobo,
   a lens being removably connected to a threaded opening in the housing,
   and when the removable lens is inserted, the housing is waterproof.

8. The system of gobos of claim 7, wherein the glass face of the first gobo comprises a series of peaks and valleys.

9. The system of gobos of claim 7, wherein the first gobo is rotated in the opposite direction around the axis perpendicular to the glass face as the second gobo.

10. The system of gobos of claim 7, wherein the first gobo and the second gobo rotate at a different speed around the axis perpendicular to the glass face of the gobo.

11. The light fixture of claim 2, wherein the first gobo and the second gobo can be moved along an axis perpendicular to the direction of the light beam.

12. The light fixture of claim 11, wherein the motion of the first gobo is in an opposite direction to the motion of the second gobo.

13. The light fixture of claim 11, wherein the motion of the first gobo is delayed from the motion of the second gobo.

14. The light fixture of claim 1, wherein the housing is designed to be water and small projectile resistant.

15. The light fixture of claim 2, further comprising:
a DMX controller having at least five channels configured to control:
   a rotation of the first gobo,
   a rotation of the second gobo,
   a rotational speed of the second gobo,
   a rotational speed of the second gobo, and
   a brightness of at least one of the semi-conductor light sources.

16. The light fixture of claim 1, wherein the plurality of semi-conductor light sources are comprised of white, Ultraviolet, or RGBX LEDs.

17. The light fixture of claim 1, wherein the plurality of semi-conductor light sources comprises a red LED, a green LED, a blue LED, and a white LED.

* * * * *